United States Patent
Gilg et al.

(10) Patent No.: US 8,463,048 B2
(45) Date of Patent: Jun. 11, 2013

(54) METHOD AND AN APPARATUS FOR DIFFERENCE MEASUREMENT OF AN IMAGE

(75) Inventors: Albert Gilg, Kaufering (DE); Utz Wever, München (DE); Yayun Zhou, München (DE)

(73) Assignee: Siemens Aktiengesellschaft, Munich (DE)

( * ) Notice: Subject to any disclaimer, the term of this patent is extended or adjusted under 35 U.S.C. 154(b) by 330 days.

(21) Appl. No.: 13/020,324

(22) Filed: Feb. 3, 2011

(65) Prior Publication Data

US 2011/0193999 A1  Aug. 11, 2011

(30) Foreign Application Priority Data

Feb. 5, 2010  (EP) .................................... 10001229

(51) Int. Cl.
G06K 9/72 (2006.01)
G06K 9/46 (2006.01)
G06K 9/40 (2006.01)
G06K 9/36 (2006.01)
G06K 9/20 (2006.01)
H04N 5/228 (2006.01)
H04N 5/235 (2006.01)
H04N 3/14 (2006.01)
H04N 5/335 (2011.01)

(52) U.S. Cl.
USPC .................... 382/213; 348/222.1; 348/230.1; 348/294; 382/207; 382/260; 382/281; 382/282; 382/283

(58) Field of Classification Search
USPC ........... 348/187–188, 222.1, 230.1, 239–256, 348/262–264, 266–283, 294–324; 382/162–167, 382/181, 190–191, 206–207, 209, 212–213, 382/232–254, 260–265, 276–283
See application file for complete search history.

(56) References Cited

U.S. PATENT DOCUMENTS

| | | | |
|---|---|---|---|
| 6,768,518 B1 | 7/2004 | Bozdagi | 348/615 |
| 6,778,683 B1 | 8/2004 | Bonner et al. | 382/101 |

(Continued)

FOREIGN PATENT DOCUMENTS

| | | |
|---|---|---|
| DE | 102006005803 | 8/2007 |
| EP | 1451530 | 1/2007 |

(Continued)

OTHER PUBLICATIONS

European Search Report and Written Opinion for Application No. 10001229.3 (7 pages), Jun. 25, 2010.

(Continued)

*Primary Examiner* — Michael Osinski
(74) *Attorney, Agent, or Firm* — King & Spalding L.L.P.

(57) ABSTRACT

In a method and apparatus for difference measurement of an image, the image is detected by an image sensor array having (N×N) sensor elements, wherein $N=2^n$, $n \geq 2$, and n being an integer number, each detected sample value is read as a positive or as a negative sample value according to a sign control pattern from a pattern control unit, and measurement values are generated for measurement template blocks of the image sensor array by a computing unit which computes for each measurement template block a weighted sum of the read sample values of the respective measurement template sensor elements depending on a predetermined measurement template. A measurement template block is, provided for at least four adjacent sensor elements of the image sensor array. The method/apparatus can be used in any kind of digital camera and allows for a fast generation of image data with a hardware implementation of low complexity.

15 Claims, 5 Drawing Sheets

U.S. PATENT DOCUMENTS

| | | | |
|---|---|---|---|
| 7,362,363 B2 | 4/2008 | Wever et al. | 348/294 |
| 7,539,352 B2* | 5/2009 | Hasegawa et al. | 382/260 |
| 8,004,586 B2* | 8/2011 | Yoo et al. | 348/241 |
| 2002/0172398 A1* | 11/2002 | Hayashi | 382/100 |
| 2003/0021456 A1 | 1/2003 | Inoue | 382/132 |
| 2004/0218825 A1 | 11/2004 | Graffagnino | 382/240 |
| 2004/0228005 A1 | 11/2004 | Dowski, Jr. | 359/671 |
| 2005/0012028 A1* | 1/2005 | Weaver et al. | 250/208.2 |
| 2005/0135700 A1* | 6/2005 | Anderson | 382/261 |
| 2006/0157640 A1 | 7/2006 | Perlman et al. | 250/208.1 |
| 2007/0183681 A1 | 8/2007 | Li et al. | 382/261 |
| 2007/0189635 A1 | 8/2007 | Borsdorf et al. | 382/275 |
| 2008/0152230 A1 | 6/2008 | Forutanpour | 382/209 |
| 2009/0020714 A1 | 1/2009 | Slinger | 250/550 |
| 2009/0175558 A1* | 7/2009 | Moriya et al. | 382/279 |
| 2009/0238460 A1* | 9/2009 | Funayama et al. | 382/181 |

FOREIGN PATENT DOCUMENTS

| | | |
|---|---|---|
| EP | 2076047 | 7/2009 |
| JP | 2008211627 | 9/2008 |
| WO | 9846007 | 10/1998 |
| WO | 9957908 | 11/1999 |

OTHER PUBLICATIONS

Struzik, "Oversampling the Haar Wavelet Transform", Report INS-R0102 (21 pages), Mar. 31, 2001.

* cited by examiner

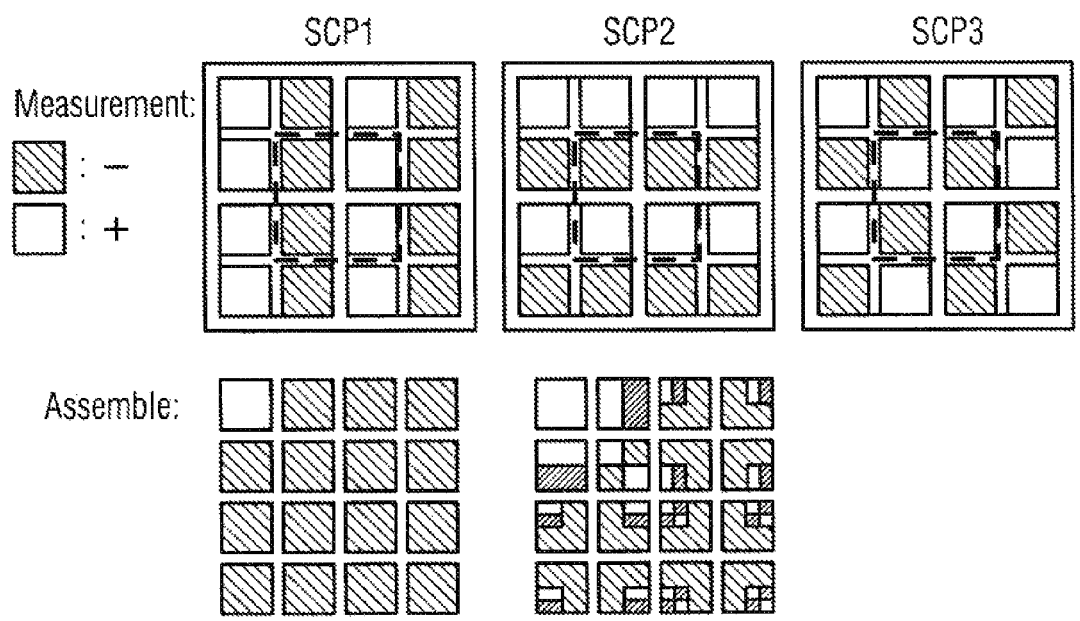

Assemble

METHOD AND AN APPARATUS FOR DIFFERENCE MEASUREMENT OF AN IMAGE

CROSS-REFERENCE TO RELATED APPLICATIONS

This application claims priority to EP Patent Application No. 10001229 filed Feb. 5, 2010. The contents of which is incorporated herein by reference in its entirety.

TECHNICAL FIELD

The invention relates to a method and an apparatus for difference measurement of an image and for detecting image data. The invention relates in particular to a wavelet image measurement scheme based on wavelet oversampling.

BACKGROUND

Nowadays a digital image sensor finds its use in almost every technical field. The application of an image sensor can vary from high bandwidth laser communication to microscopic imaging. Most commercial image sensors are fabricated as charge coupled device (CCD) or use CMOS sensor arrays.

The wavelet transformation is a known tool in many signal image processing applications. The wavelet image measurement scheme allows to localize both time and frequency and to provide a multi resolution representation of an image. A conventional software-based wavelet transformations requires extensive computational resources for a real time implementation. The use of digital signal processors DSP requires significant area and power resources. The most image sensors employing a wavelet image measurement scheme are based on a Haar wavelet transform, because a Haar wavelet transform requires only shift and addition operations suitable for a hardware implementation. This fixed circuit design has only a limited scalability due to the predetermined level of the wavelet decomposition.

SUMMARY

According to various embodiments, a method and apparatus for difference measurement of an image can be provided which allows a simple hardware implementation even when higher wavelet transformations are implemented.

According to an embodiment, a method for difference measurement of an image, may comprise: (a) detecting said image by an image sensor array having (N×N) sensor elements, wherein $N=2^n$, $n \geq 2$, and n being an integer number; (b) reading each detected sample value as a positive or as a negative sample value according to at least one sign control pattern provided by a pattern control unit; and (c) generating measurement values for measurement template blocks of said image sensor array by a computing unit which computes for each measurement template block a weighted sum of the read sample values of the respective measurement template sensor elements depending on a predetermined measurement template.

According to a further embodiment, each measurement template block of said measurement template can be provided for at least four adjacent sensor elements of said image sensor array and the generated measurement values are transformed into wavelet coefficients of said image. According to a further embodiment, three sign control patterns can be provided by said pattern control unit to said image sensor array; wherein a first sign control pattern sets the signs of sample values detected by said image sensor array for each column of said image sensor array in an alternating manner to a positive sign and to a negative sign; wherein a second sign control pattern sets the signs of the sample values detected by said image sensor array for each row of said image sensor array in an alternating manner to a positive sign and to a negative sign; wherein a third sign control pattern is formed by a chessboard-like pattern which sets all signs of sample values detected by said image sensor array for all sensor elements in alternating manner to a positive sign and to a negative sign. According to a further embodiment, the three sign control patterns can be provided to said image sensor array consecutively or in parallel. According to a further embodiment, the generated measurement values can be quantized by an analogue digital converter. According to a further embodiment, the transformed wavelet coefficients of said image can be processed by a processing unit performing an image compression, an image denoising, an image reconstruction or an image zooming.

According to another embodiment, an apparatus for difference measurement of an image may comprise: (a) an image sensor array having (N×N) sensor elements for detecting said image, wherein $N=2^n$, $n \geq 2$ and n being an integer number; (b) wherein each detected sample value is read as a positive or as a negative sample value according to at least one sign control pattern provided by a pattern control unit; and (c) a computing unit which generates measurement values for measurement template blocks of said image sensor array by computing for each measurement template block a weighted sum of the read sample values of the respective measurement template sensor elements depending on a predetermined measurement template.

According to a further embodiment of the apparatus, each measurement template block of said measurement template can be provided for at least four adjacent sensor elements of said image sensor array. According to a further embodiment of the apparatus, a transformation unit can be provided which transforms the generated measurement values into wavelet coefficients of said image. According to a further embodiment of the apparatus, three different sign control patterns are stored in a pattern memory and provided to said image sensor array by said pattern control unit in parallel or consecutively. According to a further embodiment of the apparatus, the sign control patterns may comprise: —a first sign control pattern which sets the signs of the sample values detected by said image sensor array for each column of said image sensor array in an alternating manner to a positive sign and to a negative sign; —a second sign control pattern which sets the signs of the sample values detected by said image sensor array for each row of said image sensor array in an alternating manner to a positive sign and to a negative sign; and —a third sign control pattern which is formed by a chessboard-like pattern which sets the signs of the sample values detected by said image sensor array for each column and row of said image sensor array in an alternating manner to a positive sign and to a negative sign. According to a further embodiment of the apparatus, said computing unit may comprise a measurement element for each measurement template block, said measurement element may comprise at least four sample and hold circuits for the sample values of the respective measurement template block and a summation circuit for adding the weighted sample values provided by said sample and hold circuits. According to a further embodiment of the apparatus, each sensor element of said image sensor array may comprise at least one photo diode for converting electromagnetic waves into an electrical current which is stored in a capacitor having a sample voltage corresponding to the intensity of the electromagnetic waves applied to said photo diode. According to a further embodiment of the apparatus, said image sensor array can be a CMOS sensor array or a CCD (Charge Coupled Device) sensor array.

According to another embodiment, a camera may comprise an apparatus as described above.

According to a further embodiment of the camera, the camera may further comprise an image processing unit for processing wavelet coefficients of the image.

BRIEF DESCRIPTION OF THE DRAWINGS

In the following embodiments of the method and apparatus for difference measurement of an image are described in more detail with respect to the enclosed figures.

FIG. 3 shows an embodiment of a measurement scheme for a two-dimensional sensor array;

DETAILED DESCRIPTION

Figure 1:
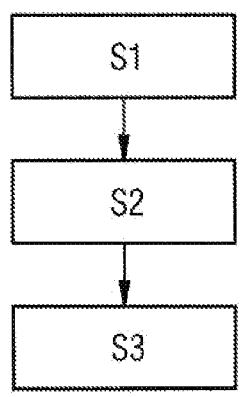
FIG. 1 shows a simple flowchart of a possible embodiment of a method for difference measurement of an image.

The various embodiments provide for a method for difference measurement of an image, said method comprising the following steps:
  detecting said image by an image sensor array having (N×N) sensor elements, wherein $N=2^n$, $n \geq 2$ and n being an integer number;
  reading each detected sample value as a positive or as a negative sample value according to at least one sign control pattern provided by a pattern control unit, and
  generating measurement values for measurement template blocks of said image sensor array by a computing unit which computes for each measurement template block a weighted sum of the read sample values of the respective measurement template sensor elements depending on a predetermined measurement template.

In a possible embodiment each measurement template block of said measurement template is provided for at least four adjacent sensor elements of said image sensor array.

The method according to various embodiments performs a difference measurement of neighbouring pixels or sensor elements which is independent of illumination conditions. The measurement method according to various embodiments truly captures the ratio between various features of the object. The difference value is generally much smaller than an original pixel value hence less bits are required after quantization. The results of the image measurement method according to various embodiments can be transformed easily to dyadic Haar wavelet coefficients for further processing. The method according to various embodiments allows to determine high order wavelets, (e.g. daubachies 4) with simple difference measurements if oversampling is employed.

In a possible embodiment of the method the generated measurement values are transformed into wavelet coefficients of said image.

In a possible embodiment of the method three sign control patterns are provided by said pattern control unit to said image sensor array.

In a possible embodiment a first sign control pattern sets the signs of sample values detected by said image sensor array for each column of said image sensor array in an alternating manner to a positive sign and to a negative sign.

In a possible embodiment a second sign control pattern sets the signs of the sample values detected by said image sensor array for each row of said image sensor array in an alternating manner to a positive sign and to a negative sign.

In a possible embodiment a third sign control pattern is formed by a chessboard-like pattern which sets all signs of a sample values detected by said image sensor array for all sensor elements in an alternating manner to a positive sign and to a negative sign.

In a possible embodiment the three sign control patterns are provided to said image sensor array consecutively.

In an alternative embodiment of the method the three sign control patterns are provided to said image sensor array in parallel.

In a possible embodiment of the method the generated measurement values are quantized by an analogue digital converter ADC.

In a possible embodiment of the method the transformed wavelet coefficients of said image are processed by a processing unit performing an image compression, an image denoising, am image reconstruction or an image zooming.

The various embodiments further provide for an apparatus for difference measurement of an image comprising:
  an image sensor array having (N×N) sensor elements for detecting said image,
  wherein $N=2^n$, $n \geq 2$ and n being an integer number,
  wherein each detected sample value is read as a positive or as a negative sample value according to at least one sign control pattern provided by a pattern control unit, and
  a computing unit which generates measurement values for measurement template blocks of said image sensor array by computing for each measurement template block a weighted sum of the read sample values of the respective measurement template sensor elements depending on a predetermined measurement template.

In a possible embodiment each measurement template block of said measurement template is provided for at least four adjacent sensor elements of said image sensor array.

In an embodiment of the apparatus a transformation unit is provided which transforms the generated measurement values into wavelet coefficients of said image.

In a possible embodiment of the apparatus the three different sign control patterns are stored in a pattern memory and provided to said image sensor array by said pattern control unit in parallel or consecutively.

In a possible embodiment of the apparatus the three sign control patterns comprise:
  a first sign control pattern which sets the signs of the sample values detected by said image sensor array for each column of said image sensor array in an alternating manner to a positive sign and to a negative sign,
  a second sign control pattern which sets the signs of the sample values detected by said image sensor array for each row of said image sensor array in an alternating manner to a positive sign and to a negative sign, and a third sign control pattern which is formed by a chessboard-like pattern which sets the signs of the sample values detected by said image sensor array for each column and row of said image sensor array in an alternating manner to a positive sign and to a negative sign.

In a possible embodiment of the apparatus the computing unit comprises a measurement element for each measurement template block, said measurement element comprising at least four sample and hold circuits for the sample values of the respective measurement template block and a summation circuit for adding the weighted sample values provided by said sample and hold circuits.

In a possible embodiment of the apparatus each sensor element of said image sensor array comprises at least one photo diode for converting electromagnetic waves into electrical current, which is stored in a capacitor having a sample voltage corresponding to the intensity of the electromagnetic waves applied to said photo diode.

In a possible embodiment of the apparatus the image sensor array is formed by a CMOS sensor array.

In a further embodiment of the apparatus the image sensor array is formed by a CCD (charge coupled device) sensor array.

The various embodiments further provide for a camera comprising an apparatus for difference measurement of an image comprising:

(a) an image sensor array having (N×N) sensor elements for detecting said image, wherein N=$2^n$, n≧2 and n being an integer number;
(b) wherein each detected sample value is read as a positive or as a negative sample value according to at least one sign control pattern provided by a pattern control unit; and
(c) a computing unit which generates measurement values for measurement template blocks of said image sensor array by computing for each measurement template block a weighted sum of the read sample values of the respective measurement template sensor elements depending on a predetermined measurement template.

In an embodiment the camera further comprises a processing unit for processing wavelet coefficients of the image.

As can be seen in FIG. 1 a method for difference measurement of an image according to various embodiments comprises in a possible embodiment three steps S1, S2, S3.

In a first step S1 the image is detected by an image sensor array having (N×N) sensor elements. This image sensor array can comprise N=$2^n$ sensor elements, wherein n is an integer number and n being ≧2.

In a further step S2 each detected sample value is read as positive or as a negative sample value according to at least one sign control pattern SCP provided by a pattern control unit. In a possible embodiment three sign control patterns SCP1, SCP2, SCP3 are provided to the image sensor array such as described below with reference to the hardware implementation shown in FIG. 5.

In a further step S3 measurement values are generated for measurement template blocks MTB of said image sensor array by a computing unit which computes for each measurement template block MTB a weighted sum of the read sample values of the respective measurement template sensor elements depending on a predetermined measurement template MT. Each measurement template block MTB of said measurement template MT is provided in a possible embodiment for at least four adjacent sensor elements of said image sensor array.

In a further step (not shown in FIG. 1) the generated measurement values are then transformed into wavelet coefficients of the image and can be further processed. In an embodiment three sign control patterns SCP are provided by the pattern control unit when reading the detected sample values of the image sensor array.

A first sign control pattern $SCP_1$ sets the signs of sample values detected by the image sensor array for each column of said image sensor array in an alternating manner to a positive sign and to a negative sign.

A second sign control pattern $SCP_2$ sets the signs of the sample values detected by the image sensor array for each row of said image sensor array in an alternating manner to a positive sign and to a negative sign.

A third sign control pattern $SCP_3$ is formed by a chessboard-like pattern which sets all signs of sample values detected by said image sensor array for all sensor elements in an alternating manner to a positive sign and to a negative sign.

Figure 4:
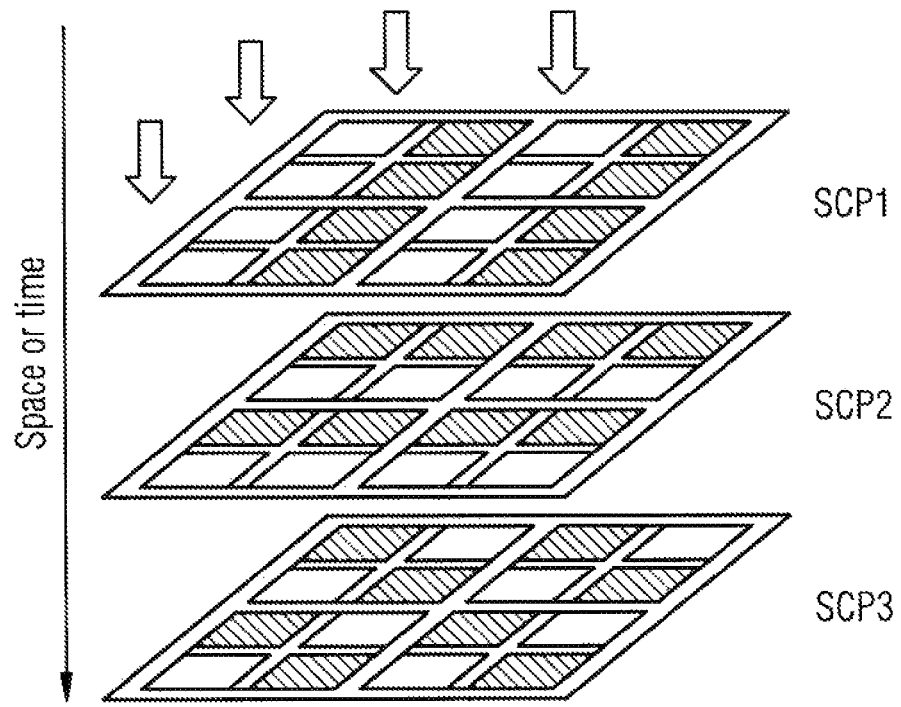
FIG. 4 shows a diagram for illustrating the functionality of a method and apparatus for difference measurement according to various embodiments.

FIGS. 3, 4 show three different sign control patterns SCP, i.e. a first sign control pattern $SCP_1$, a second sign control pattern $SCP_2$ and a third chessboard-like sign control pattern $SCP_3$.

In a possible embodiment the three sign control patterns SCP can be provided as a pattern control unit to the image sensor array consecutively in time or in parallel as illustrated in FIG. 4.

The generated measurement values generated in step S3 of FIG. 1 can in a further step be quantized by an analogue digital converter for further processing. These measurement values can be transformed into wavelet coefficients of the image. In a possible embodiment the transformed wavelet coefficients of said image are then processed by a processing unit performing for example an image compression, an image denoising, an image reconstruction or an image zooming.

The method for difference measurement of an image as shown in FIG. 1 is performed by an hardwired arrangement in real time. The generated measurement values can be transformed into wavelet coefficients for the image of further processing.

A Haar wavelet transform is the simplest wavelet transform, because its low-pass sub-band is the average and the high-pass sub-band is being the difference of the data samples. The Haar wavelet function is defined as a step function:

$$\psi(t) = \begin{cases} 1, & \text{for } t \in \left[0, \frac{1}{2}\right) \\ -1, & \text{for } t \in \left[\frac{1}{2}, 1\right) \\ 0, & \text{otherwise.} \end{cases}$$

Since scaling and dilation of a basic wavelet can generate the basis Haar functions, any Haar function can be generated by means of the formulas:

$$\psi_i^j(t) = \sqrt{2^j}\psi(2^j t - i),$$

where i=0, 1, ..., $2^j-1$ and j=0, 1, ..., $\log_2 N-1$. The Haar transform can be understood as a combination of Haar wavelets with different scale and shift parameters. The Haar scaling function is defined as:

$$\Phi(t) = \begin{cases} 1, \text{ for } t \in [0, 1) \\ 0, \text{ for } t \notin [0, 1) \end{cases}$$

Hence, the Haar transform can be expressed as a combination of the scaling function and several Haar Wavelets $\psi_i^j(t)$.

Figure 2A:
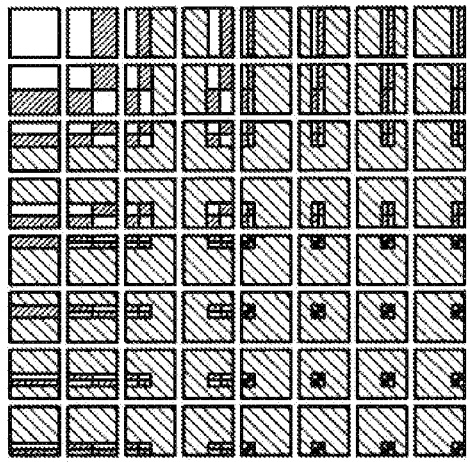
FIGS. 2A-2B shows a diagram of wavelet transforms in a two-dimensional space illustrating the functionality of the method and apparatus according to various embodiments.

FIG. 2A shows coefficients of a standard 2D Haar wavelet transform. Pixels are added where white color appears and subtracted where the black color appears. The classical Haar transform gives different spectral coefficients on different decomposition levels.

Figure 2B:
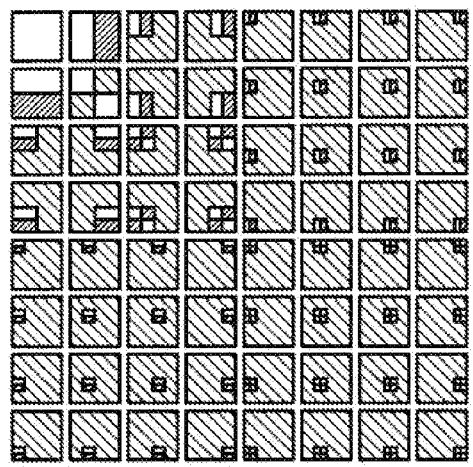

A dyadic wavelet transform is a more efficient representation for entropy coding in image compression. It is a slightly modified 2D Haar wavelet transform, whose basis functions are shown in FIG. 2B. The alternation between rows and columns are applied within each decomposition step, leading to a multi-scale version of three independent basis patterns. The wavelet basis functions can be interpreted as three independent forms in different scales:

$$\psi^H = \frac{1}{4}\begin{pmatrix} +1 & -1 \\ +1 & -1 \end{pmatrix}$$

$$\psi^V = \frac{1}{4}\begin{pmatrix} +1 & +1 \\ -1 & -1 \end{pmatrix}$$

$$\psi^D = \frac{1}{4}\begin{pmatrix} +1 & -1 \\ -1 & +1 \end{pmatrix}$$

This structure avoids the sequential operation along rows and columns in a standard Haar wavelet transform, providing a possibility to implement a parallel measurement.

In an embodiment three different basis patterns or sign control patterns SCP are employed. Those patterns SCP are independent from each other, which leads to a parallel architecture in hardware implementation. An oversampling scheme has redundancy. In this measurement, only the dyadic wavelet coefficient related measurements are reserved. The selection principle induces a delicate symmetric template. Combining the three sign control patterns SCP with a selection or measurement template MT, the 2D oversampling-based measurement is determined.

FIG. 3 shows a measurement scheme for a 4×4 sensor array. The three sign control patterns $SCP_1$, $SCP_2$, $SCP_3$ represent each a different manner of interpreting a sample value from each sensor element of the sensor array. A white color means counting the sample value as positive, while the black color counts as a negative sample value.

For a 4×4 sensor array as shown in FIG. 3, the selection pattern or measurement template MT has two coefficient levels. The four blocks in each corner of the respective sensor array form a first coefficient level L1 and the second blocks in the center of the respective sensor array (dashed line) form a second coefficient level L2. Each measurement template block MTB contains four pixels, whose signed summations constitute the measurements. The acquired measurements $M_{ij}$ can be reassembled in a similar form as dyadic wavelet coefficients. The first level (L1) measurements are consistent with the first level dyadic wavelet coefficients. The second level dyadic wavelet coefficients can be derived by a linear combination of the derived measurements. As can be seen in FIG. 3 in each $2^2 \times 2^2$ sensor array five measurements are performed for 5 measurement template blocks (MTB). The 15 measurement S can either be achieved by switching between $SCP_1$, $SCP_2$ and $SCP_3$ consecutively or by providing a sensor array having three layers and applying $SCP_1$ to a first sensor array layer, $SCP_2$ to a second sensor array layer and $SCP_3$ to a third sensor array layer of the sensor array.

Similarly, in a 8×8 and 16×16 sensor element case, the dyadic wavelet coefficients in higher levels can be computed recursively. Therefore, this measurement is equivalent to a dyadic wavelet decomposition.

The independence of three patterns $SCP_1$, $SCP_2$, $SCP_3$ provide a parallel architecture as shown in FIG. 4. Compared with the traditional dyadic wavelet transform, this measurement has a simpler structure, which avoids complicated switch operations. The pattern number and the structure of the measurement template MT remain unchanged when the size of sensor array increases, which simplifies the circuit design process. All computation can be carried out simultaneously, leading to less process time. Besides, only the difference of adjacent pixels is recorded, which captures the true features of an object and eliminates effects of the illumination condition. It also increases the dynamic range of the measurement, since the variance of the difference value is generally smaller than the variance of the absolute value. Consequently, the throughout can be reduced after the quantization step.

Figure 5:
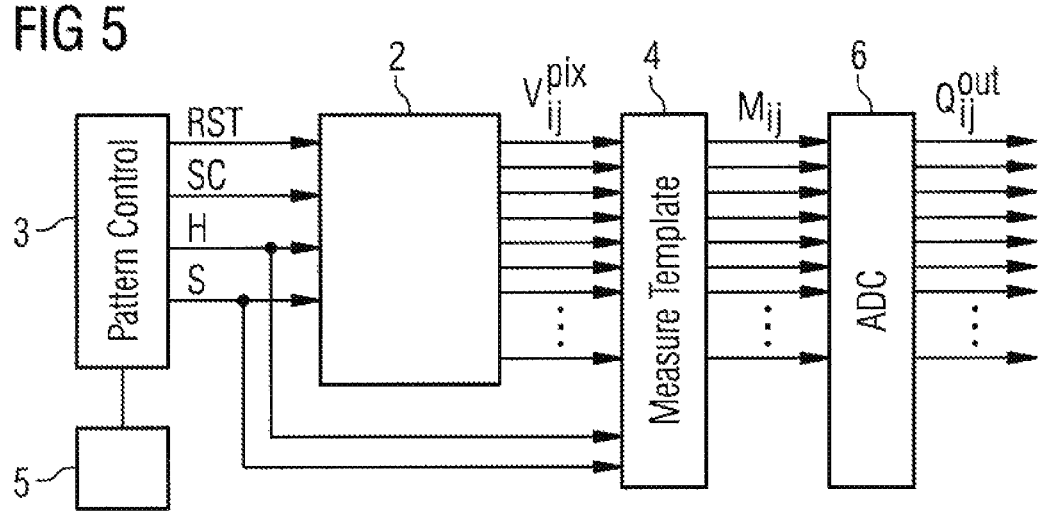
FIG. 5 shows a block diagram of a possible embodiment of the apparatus for difference measurement of an image.

FIG. 5 shows an embodiment of an apparatus 1 for difference measurement of an image.

The apparatus 1 comprises an image sensor array 2 having (N×N) sensor elements for detecting the image originating from the respective object. The number N is $N=2^n$ wherein $n \geq 2$ and n being an integer number. The image sensor array 2 can be formed by a CMOS sensor array. In a further embodiment the image array 2 can be formed by a CCD (charge coupled device) sensor array. The sensor array 2 comprises a plurality of sensor elements. Each sensor element of the image sensor array 2 can comprise at least one photo diode PD for converting electric magnetic waves into an electrical current. In a possible embodiment the electric current is stored in a capacitor C having a sample voltage V corresponding to the intensity I of the electromagnetic waves applied to the respective photo diode PD. Each sample value is read as a positive or as a negative sample value according to at least one sign control pattern SCP provided by a pattern control unit 3 of the apparatus 1 as shown in FIG. 5. In a possible embodiment three sign control patterns $SCP_1$, $SCP_2$, $SCP_3$ are provided by the pattern control unit 3 to the image sensor array 2.

A first sign control pattern $SCP_1$ sets the signs of sample values detected by the image sensor array 2 for each column of said image sensor array 2 in an alternating manner to a positive sign and to a negative sign.

$$Av = A;$$

$$\text{for } j = 1 \text{ to } \frac{N}{2}$$

$$Av_{i,2j} = -A_{i,2j};$$

wherein the detected image A has the image size N×N, $N=2^n$, wherein n is an integer number, e.g. n=2.

The second sign control pattern $SCP_2$ sets the signs of the sample values detected by the said image sensor array 2 for each row of said image sensor array 2 in an alternating manner to a positive sign and to a negative sign.

$$Ah = A;$$

$$\text{for } i = 1 \text{ to } \frac{N}{2}$$

$$Ah_{2i,j} = -A_{2i,j};$$

The third sign control pattern $SCP_3$ is formed by a chessboard-like pattern which sets all signs of sample values detected by said image sensor array 2 for all sensor elements in an alternating manner to a positive sign and to a negative sign.

$$Ad = A;$$

$$\text{for } i = 1 \text{ to } \frac{N}{2};$$

$$Ad_{2i,j} = -A_{2i,j};$$

$$\text{for } j = 1 \text{ to } \frac{N}{2};$$

$$Ad_{i,2j} = -Ad_{i,2j};$$

The three sign control patterns $SCP_1$, $SCP_2$, $SCP_3$ as defined by the above equations can be provided to the image sensor array 2 in a possible embodiment consecutively, e.g. sequentially in time.

In an alternative embodiment the three sign control patterns $SCP_1$, $SCP_2$, $SCP_3$ can be provided to the image sensor array 2 in parallel. The pattern control unit 3 as shown in FIG. 5 is connected to the sensor array 2 via control lives as shown in FIG. 5. The pattern control unit 3 provides sample and hold control signals S, H to control sample and hold circuits. Further, it applies switch control signals SC to the sensor array 2 as shown. The pattern control unit 3 generates control signals with respect to the three signal control patterns SCP as sample and hold signals S/H and a sign control signals SC. The sign control signals SC can be generated by logic circuits for each basic sign control pattern. Each sample value detected by the sensor array 2 is read as a positive or as a negative sample value according to at least one sign control pattern SCP provided by the pattern control unit 3. The apparatus 1 further comprises a computing unit 4 which generates measurement values for measurement template blocks MTB of said image sensor array 2 by computing for each measurement template block MTB a weighted sum of the read sample values of the respective measurement template sensor elements depending on a predetermined measurement template MT. Each measurement template block MTB of said measurement template is provided in a possible embodiment for at least four adjacent sensor elements of said image sensor array 2. The measurement template MT can be expressed as follows;

Measure the difference blockwise:

$$\text{for } k = 1 \text{ to } n$$

$$\text{for } i = 1 \text{ to } \frac{N}{2^k}$$

$$\text{for } j = 1 \text{ to } \frac{N}{2^k}$$

$$M = Ah_{r1,c1} + Ah_{r2,c2} + Ah_{r3,c3} + Ah_{r4,c4};$$

$$r1 = 2^{(k-1)} + 2^k \cdot (i-1),$$

$$c1 = 2^{(k-1)} + 2^k \cdot (j-1);$$

$$r2 = 2^{(k-1)} + 2^k \cdot (i-1) + 1,$$

$$c2 = 2^{(k-1)} + 2^k \cdot (j-1);$$

$$r3 = 2^{(k-1)} + 2^k \cdot (i-1),$$

$$c3 = 2^{(k-1)} + 2^k \cdot (j-1) + 1;$$

$$r4 = 2^{(k-1)} + 2^k \cdot (i-1) + 1,$$

$$c4 = 2^{(k-1)} + 2^k \cdot (j-1) + 1;$$

Assemble the measurements in matrix:

$$W\left(\frac{N}{2^k} + i, j\right) = M$$

Figure 8A:
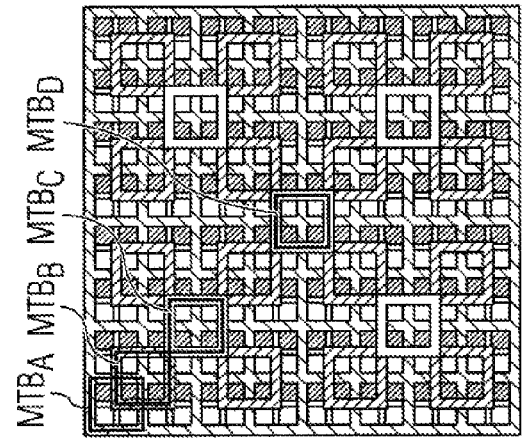
FIGS. 8, 8A-8C shows an example of a 2D oversampling based measurement of a 16×16 sensor array using three sign pattern controls and a measurement template.
Figure 8B:
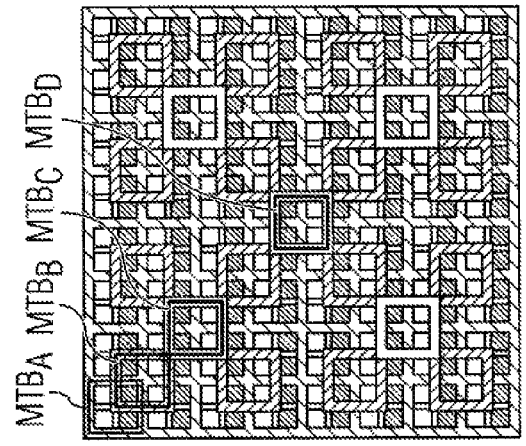
Figure 8C:
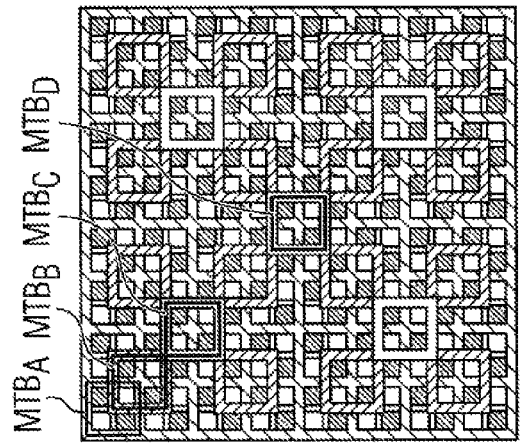
Figure 8:
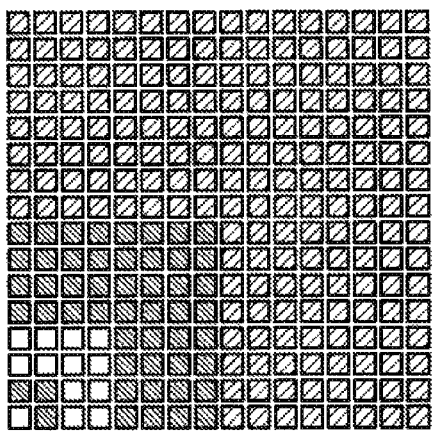

An example of such a measurement template MT is shown in FIG. 8.

Figure 6:
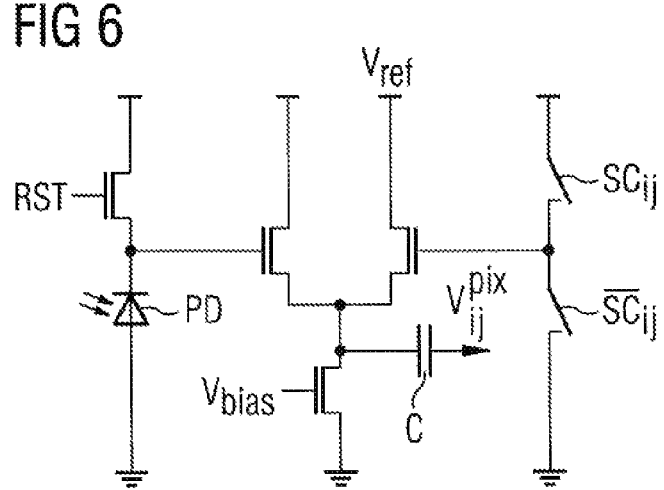
FIG. 6 shows a sample and hold circuit and a sign control as employed by an apparatus for difference measurement of an image according to a possible embodiment.
Figure 7:
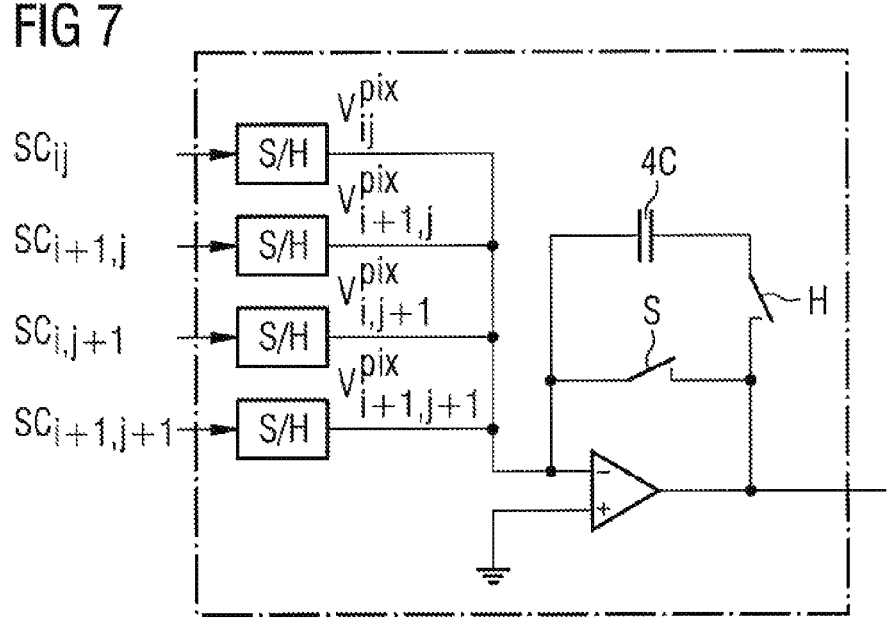
FIG. 7 shows an implementation of a measurement element as employed by an apparatus for difference measurement of an image according to a possible embodiment.

The computation unit 4 comprises basic measurement elements as shown for instance in FIG. 7. The sensor array 2 comprises photo diodes PD and an integrated sign control as shown in FIG. 6.

The difference sign control patterns SCP are stored in a possible embodiment of the apparatus 1 in a pattern memory 5 as shown in FIG. 5. In an alternative embodiment the sign control patterns SCP are loaded by the pattern control unit 3 via an interface from a database.

FIG. 6 shows an exemplary embodiment of a sensor element in the sensor array 2. The sensor element comprises a photo diode PD which converts electromagnetical waves into an electrical current I and can be stored in a capacitor C as shown in FIG. 6. The electromagnetic waves can be in the visible but also in the non-visible frequency range. This capacitor C has a sample voltage V corresponding to the intensity of the electromagnetic waves applied to the photo diode PD of the sensor element. A reset can be performed by a reset control signal RST. For each sensor element a sign control circuit with two switches can be provided wherein these switches are controlled by the pattern control unit 3 according to the pattern mask. The three different sign control patterns SCP can be applied by the pattern control unit 3 in parallel or consecutively to the sensor array 2. Each detected sample value is read as a positive or as a negative sample value according to the control signals applied to the switches SC, $\overline{SC}$ as shown in FIG. 6 by the pattern control unit 3.

The read sample values from the sensor array 2 are supplied to the computing unit 4 comprising for each measurement template block MTB a basic measurement element as shown in FIG. 7. The measurement element comprises at least four sample and hold circuits for the sample values of the respective measurement template block MTB wherein the measurement template block MTB is provided for at least four adjacent sensor elements of the image sensor array 2. Further, the measurement element shown in FIG. 7 comprises a summation circuit for adding the weighted sample values provided by said sample and hold circuits. This summation circuit comprises an operational amplifier and at least one capacitor in its feedback loop.

The accumulated photons are counted as a positive or negative output voltage. The clocks S/H are non-overlapping. If the sign control signal SC is low during the sample phase S and goes high during the hold phase H, the amount of charge transferred is $C(V_{ij}^{int} - V_{ref})$, where $V_{ij}^{int}$ is the voltage collected in the sample phase, $V_{ref}$ is defined as the pixel voltage when there is no light. Conversely, if SC is high during the sample phase S and goes low during the hold phase, the amount of charge transferred is $C(V_{ref}-V_{ij}^{int})$.

The main computation unit 4 is the measurement template unit. It contains basic measurement elements arranged as the measurement template MT defined above. A basic measurement element is shown in FIG. 7, which computes the weighted sum of adjacent pixels in an image. The capacitor is set to 4C in order to get a normalized measurement. The output of the operational amplifier is given as:

$$M_{ij} = \frac{1}{4}\sum_{i,j}(V_{i,j}^{int} - V_{ref}) \cdot SC_{ij}.$$

where $SC_{ij}$ is either +1 or −1. Finally, the measured differences are quantisized through a AD converter 6. The hardware design shown in FIGS. 6, 7 is only an example of a measurement realization, in which the measurement is done consecutively. It contains switch circuits transferring one basis pattern to another. The measurement schema can also be carried out simultaneously, which means implementing the measurement template MT concerning each pattern layer-by-layer. It avoids the switch operation between the three patterns, hence it is even faster.

FIG. 8 shows an example of a two-dimensional oversampling based measurement for a 16×16 array. In the given example the sensor array comprises 16×16 pixels. As can be seen in FIGS. 8A, 8B, 8C three different sign control patterns SCP1, SCP2, SCP3 are applied for interpretation of the sampled values as positive or negative. Furthermore, the same common measurement template MT is applied to the array as can be seen in FIGS. 8A, 8B, 8C. As can be seen in FIG. 8A a first sign control pattern SCP1 and the measurement template MT is provided to the sensor array. As can be seen in FIG. 8B the second sign control pattern SCP2 and the same measurement template MT is applied to the sensor array. Further, as can be seen in FIG. 8C a third chessboard-like sign control pattern SCP3 is applied to the sensor array along with the same measurement template MT. As can be seen from FIGS. 8A, 8B, 8C the measurement template MT consists of measurement template blocks MTB each consisting of four adjacent pixels. As can be seen in the FIGS. 8A, 8B, 8C on the finest level 8×8=64 measurement template blocks $MTB_A$ are provided in the measurement template MT covering the complete sensor array. This measurement template blocks $MTB_A$ provide directly the dyadic wavelet transforms with the finest resolution level.

On the next coarser level of the dyadic wavelet transform 4×4=16 measurement template blocks $MTB_B$ are provided as shown in FIGS. 8A, 8B, 8C. As can be seen from FIGS. 8A, 8B, 8C the measurement template blocks such as measurement template blocks $MTB_A$ and $MTB_B$ can overlap. On the next coarser level 2×2=4 measurement template blocks $MTB_C$ are provided in the measurement template MT as shown in FIGS. 8A, 8B, 8C. On the highest level in the shown example a single measurement template block $MTB_D$ is located in the centre of the sensor array as shown in FIGS. 8A, 8B, 8C. As can be seen from FIGS. 8A, 8B, 8C the measurement template blocks $MTB_A$, $MTB_B$, $MTB_C$, $MTB_D$ are arranged in a symmetric manner around the centre of the sensor array and provide different resolution levels. The measurements can be assembled in a matrix W. The three different sign control patterns SCP shown in FIGS. 8A, 8B, 8C can be applied to the sensor array sequentially or in parallel provided the sensor array comprises three layers of sensor elements.

The hardware implementation of the apparatus 1 according to the various embodiments is simpler than in a traditional wavelet transformation unit. The independent pattern structure provides the capability of parallel computation.

The independence of the difference measurement basic patterns allows two ways of hardware implementation. In a first embodiment the measurement done is consecutively and a switch circuit controls the transferring between the three basic sign control patterns SCP. In an alternative embodiment the measurements are done at the same time. In this embodiment cabling of the sensor elements is fixed and three patterns are provided layer-by-layer. The measurement can be implemented by an adapted scale control from a coarse level to a finest level. The apparatus 1 can use a fixed measurement template MT and a fixed number of mask patterns such as three mask patterns $SCP_1$, $SCP_2$, $SCP_3$. In a possible embodiment a switching between three mask patterns SCP is performed simultaneously or three different sensor layers are provided in the sensor array 2. The apparatus and method according to various embodiments provide flexibility because a finest resolution can be measured and other resolutions are convertible.

The apparatus 1 can be integrated into a digital camera. This digital camera can detect images in the visible or non-visible frequency band. The camera can for example generate an infrared image or a normal photograph. The camera can for example also be integrated in a weather forecast satellite.

What is claimed is:

1. A method for difference measurement of an image, said method comprising:
   detecting said image by an image sensor array having N×N sensor elements, wherein $N=2^n$, $n \geq 2$, and n being an integer number, wherein a predetermined measurement template defines a plurality of measurement template blocks, each measurement template block including a subset of the sensor elements;
   reading each detected sample value as a positive or as a negative sample value according to at least one sign control pattern provided by a pattern control unit; and
   generating measurement values for the measurement template blocks of said image sensor array by using a computing unit to calculate for each measurement template block a weighted sum of the read sample values of the sensor elements of the respective measurement template block; wherein three sign control patterns are provided by said pattern control unit to said image sensor array; wherein a first sign control pattern sets the signs of sample values detected by said image sensor array for each column of said image sensor array in an alternating manner to a positive sign and to a negative sign; wherein a second sign control pattern sets the signs of the sample values detected by said image sensor array for each row of said image sensor array in an alternating manner to a positive sign and to a negative sign; and wherein a third sign control pattern is formed by a chessboard-like pattern which sets all signs of sample values detected by said image sensor array for all sensor elements in alternating manner to a positive sign and to a negative sign.

2. The method according to claim 1,
   wherein each measurement template block of said measurement template is provided for at least four adjacent sensor elements of said image sensor array and the generated measurement values are transformed into wavelet coefficients of said image.

3. The method according to claim 1,
   wherein the three sign control patterns are provided to said image sensor array consecutively or in parallel.

4. The method according to claim 1,
wherein the generated measurement values are quantized by an analogue digital converter.

5. The method according to claim 2,
wherein the transformed wavelet coefficients of said image are processed by a processing unit performing an image compression, an image denoising, an image reconstruction or an image zooming.

6. An apparatus for difference measurement of an image comprising:
an image sensor array having N×N sensor elements for detecting said image, wherein $N=2^n$, $n \geq 2$ and n being an integer number, wherein a predetermined measurement template defines a plurality of measurement template blocks, each measurement template block including a subset of the sensor elements;
wherein each detected sample value is read as a positive or as a negative sample value according to at least one sign control pattern provided by a pattern control unit; and
a computing unit which generates measurement values for the measurement template blocks of said image sensor array by computing for each measurement template block a weighted sum of the read sample values of the sensor elements of the respective measurement template block; wherein three different sign control patterns are stored in a pattern memory and provided to said image sensor array by said pattern control unit in parallel or consecutively;
and wherein the sign control patterns comprise: a first sign control pattern which sets the signs of sample values detected by said image sensor array for each column of said image sensor array in an alternating manner to a positive sign and to a negative sign; a second sign control pattern which sets the signs of the sample values detected by said image sensor array for each row of said image sensor array in an alternating manner to a positive sign and to a negative sign;
and a third sign control pattern which is formed by a chessboard-like pattern which sets all signs of sample values detected by said image sensor array for all sensor elements in alternating manner to a positive sign and to a negative sign.

7. The apparatus according to claim 6,
wherein each measurement template block of said measurement template is provided for at least four adjacent sensor elements of said image sensor array.

8. The apparatus according to claim 6,
wherein a transformation unit is provided which transforms the generated measurement values into wavelet coefficients of said image.

9. The apparatus according to claim 6,
wherein said computing unit comprises a measurement element for each measurement template block,
said measurement element comprising at least four sample and hold circuits for the sample values of the respective measurement template block and
a summation circuit for adding the weighted sample values provided by said sample and hold circuits.

10. The apparatus according to claim 6,
wherein each sensor element of said image sensor array comprises at least one photo diode for converting electromagnetic waves into an electrical current which is stored in a capacitor having a sample voltage corresponding to the intensity of the electromagnetic waves applied to said photo diode.

11. The apparatus according to claim 6,
wherein said image sensor array is a CMOS sensor array or a CCD sensor array.

12. A camera comprising an apparatus for difference measurement of an image comprising:
an image sensor array having N×N sensor elements for detecting said image, wherein $N=2^n$, $n \geq 2$ and n being an integer number, wherein a predetermined measurement template defines a plurality of measurement template blocks, each measurement template block including a subset of the sensor elements;
wherein each detected sample value is read as a positive or as a negative sample value according to at least one sign control pattern provided by a pattern control unit; and
a computing unit which generates measurement values for the measurement template blocks of said image sensor array by computing for each measurement template block a weighted sum of the read sample values of the sensor elements of the respective measurement template block; wherein three different sign control patterns are stored in a pattern memory and provided to said image sensor array by said pattern control unit in parallel or consecutively;
and wherein the sign control patterns comprise: a first sign control pattern which sets the signs of sample values detected by said image sensor array for each column of said image sensor array in an alternating manner to a positive sign and to a negative sign; a second sign control pattern which sets the signs of the sample values detected by said image sensor array for each row of said image sensor array in an alternating manner to a positive sign and to a negative sign;
and a third sign control pattern which is formed by a chessboard-like pattern which sets all signs of sample values detected by said image sensor array for all sensor elements in alternating manner to a positive sign and to a negative sign.

13. A camera according to claim 12, further comprising an image processing unit for processing wavelet coefficients of the image.

14. The camera according to claim 12,
wherein each measurement template block of said measurement template is provided for at least four adjacent sensor elements of said image sensor array.

15. The camera according to claim 12,
wherein a transformation unit in provided which transforms the generated measurement values into wavelet coefficients of said image.

* * * * *